(12) United States Patent
Lee (10) Patent No.: US 6,233,065 B1
(45) Date of Patent: May 15, 2001

(54) SCANNER WITH TRANSMISSION-MODE SCANNING FUNCTION

(75) Inventor: Midals Lee, Yunlin Hsien (TW)

(73) Assignee: Mustek Systems, Inc., Hsinchu (TW)

( * ) Notice: Subject to any disclaimer, the term of this patent is extended or adjusted under 35 U.S.C. 154(b) by 0 days.

(21) Appl. No.: 09/007,641

(22) Filed: Jan. 15, 1998

(30) Foreign Application Priority Data

Mar. 26, 1997 (TW) .................................................. 86204703

(51) Int. Cl.⁷ ........................................................ H04N 1/04
(52) U.S. Cl. ......................... 358/475; 358/497; 358/487; 358/474
(58) Field of Search .................................... 358/475, 497, 358/494, 487, 509, 506, 474, 483, 473; 399/211; 375/75; 382/312; 250/208.1, 236, 234

(56) References Cited

U.S. PATENT DOCUMENTS

| | | | |
|---|---|---|---|
| 4,893,196 | * | 1/1990 | Koshiyouji et al. .................. 358/474 |
| 5,251,072 | * | 10/1993 | Fukuoka et al. ...................... 358/487 |
| 5,453,850 | * | 9/1995 | Akuzawa et al. ..................... 358/475 |
| 5,555,105 | * | 9/1996 | Shahir et al. . |
| 5,696,609 | * | 12/1997 | Cresens et al. . |
| 5,895,914 | * | 4/1999 | Tsai ...................................... 250/234 |
| 5,898,171 | * | 4/1999 | McConica et al. ................... 250/234 |

* cited by examiner

Primary Examiner—Cheukfan Lee
(74) Attorney, Agent, or Firm—Gottlieb, Rackman & Reisman, P.C.

(57) ABSTRACT

A scanner with transmission-mode scanning function for scanning an article to obtain an electronic signal. The scanner includes a housing, a scanning window having a first side and a second opposite side, a moving carriage having therein an image-picking device and mounted at the first side of the scanning window, and a combining device which includes a guiding path, a first luminous body mounted at the second opposite side of the scanning window for providing a first optical signal, and a linking device connected to the moving carriage and to the first luminous body to enable the moving carriage and the first luminous body to be synchronously moved along the guiding path.

16 Claims, 7 Drawing Sheets

SCANNER WITH TRANSMISSION-MODE SCANNING FUNCTION

FIELD OF THE INVENTION

The present invention is related to a scanner, and more particularly to a scanner with transmission-mode scanning function.

BACKGROUND OF THE INVENTION

Image processing is often heard of in photography and movies. The scanner is an indispensable part of this technology. There are two kinds of scanner: one is reflection-mode, and the other is transmission-mode. The reflection scanner is used for scanning an opaque article such as common papers, while the transmission scanner is used for scanning a transparent article such as transparencies, and is not as popular as the reflection scanner.

Figure 1A:
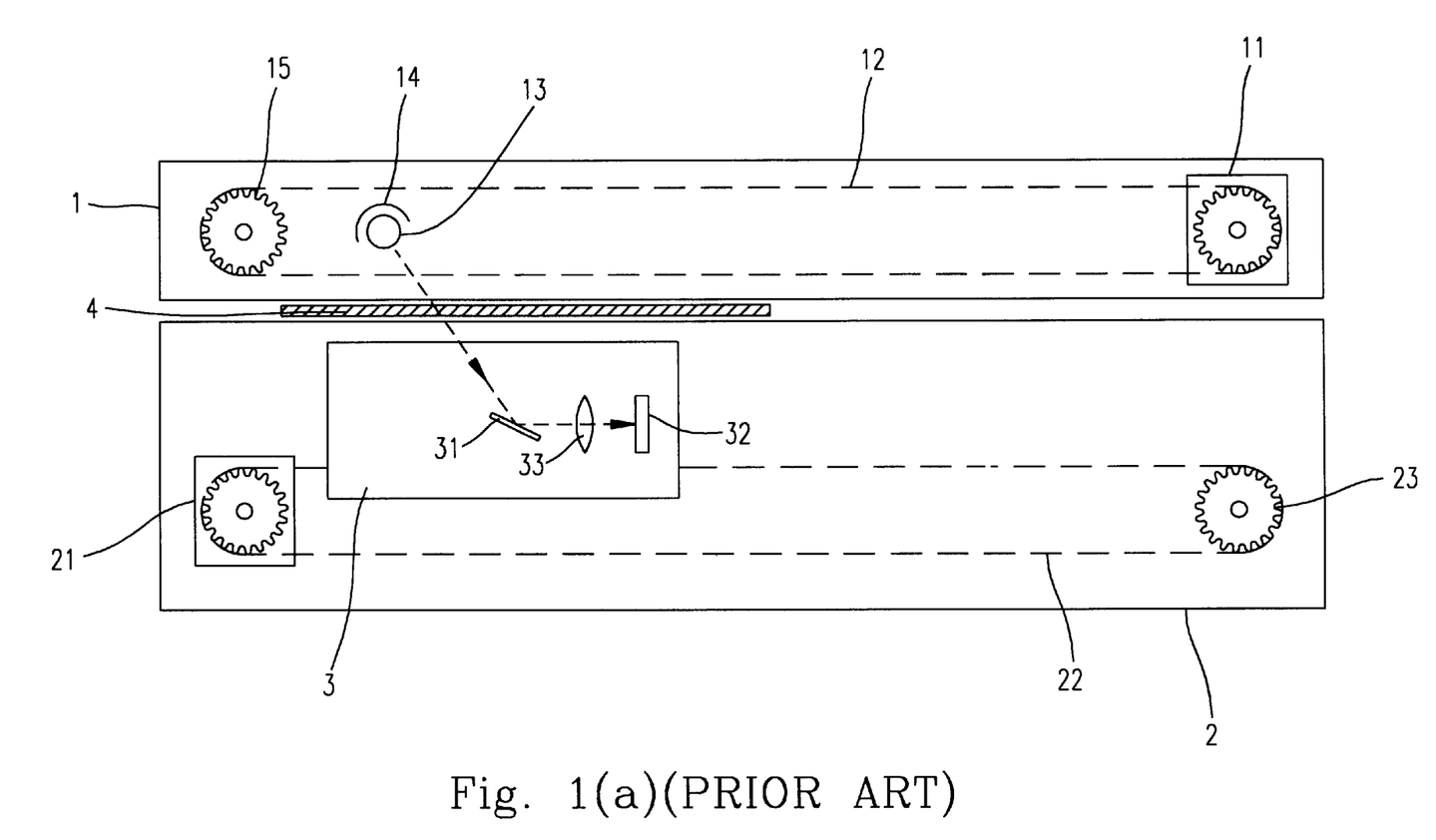
FIGS. 1(a)–(b) are side views showing a scanner with transmission-mode scanning function and a scanner with both transmission-mode and reflection-mode scanning function respectively according to the prior art.

A side view of a conventional transmission scanner is shown in FIG. 1(a). The scanner has an upper housing 1 and a lower housing 2, and is used for scanning a transparency 4. A transmissive light source 13 electrically connected to a socket 14 provides an optical signal for the transparency 4 to generate a scan optical signal. In the moving carriage 3 is an image-picking device used for processing the generated scan optical signal. The image-picking device includes a mirror 31, a charge coupled device 32, and a lens set 33. The scan optical signal is transmitted to the charge coupled device 32 by the mirror 31, then the charge coupled device 32 converts the scan optical signal into an electronic signal to form digital information later, while the lens set 33 is used for focusing the scanned signal in order to shorten the length of the moving carriage 3. According to the operating principle, the transmissive light source 13 must be moved with the moving carriage 3 synchronously in order to scan the whole transparency 4. Therefore, the driving device is needed to move the transmissive light source 13 in the upper housing 11 and the moving carriage 3 in the lower housing 2. The motors 111 and 21 drive the corresponding belts 12 and 22 to circulate around the corresponding gears 15 and 23 and the corresponding motors 11 and 21. The transmissive light source 13 and the moving carriage 3 are respectively moved between corresponding gears 15 and 23 and corresponding motors 11 and 21 by corresponding belts 12 and 22. The conventional transmission scanner must be equipped with two sets of driving device which not only occupy more volume but also require higher production cost. Certainly, the complexity of the circuits can not be ignored.

Figure 1B:
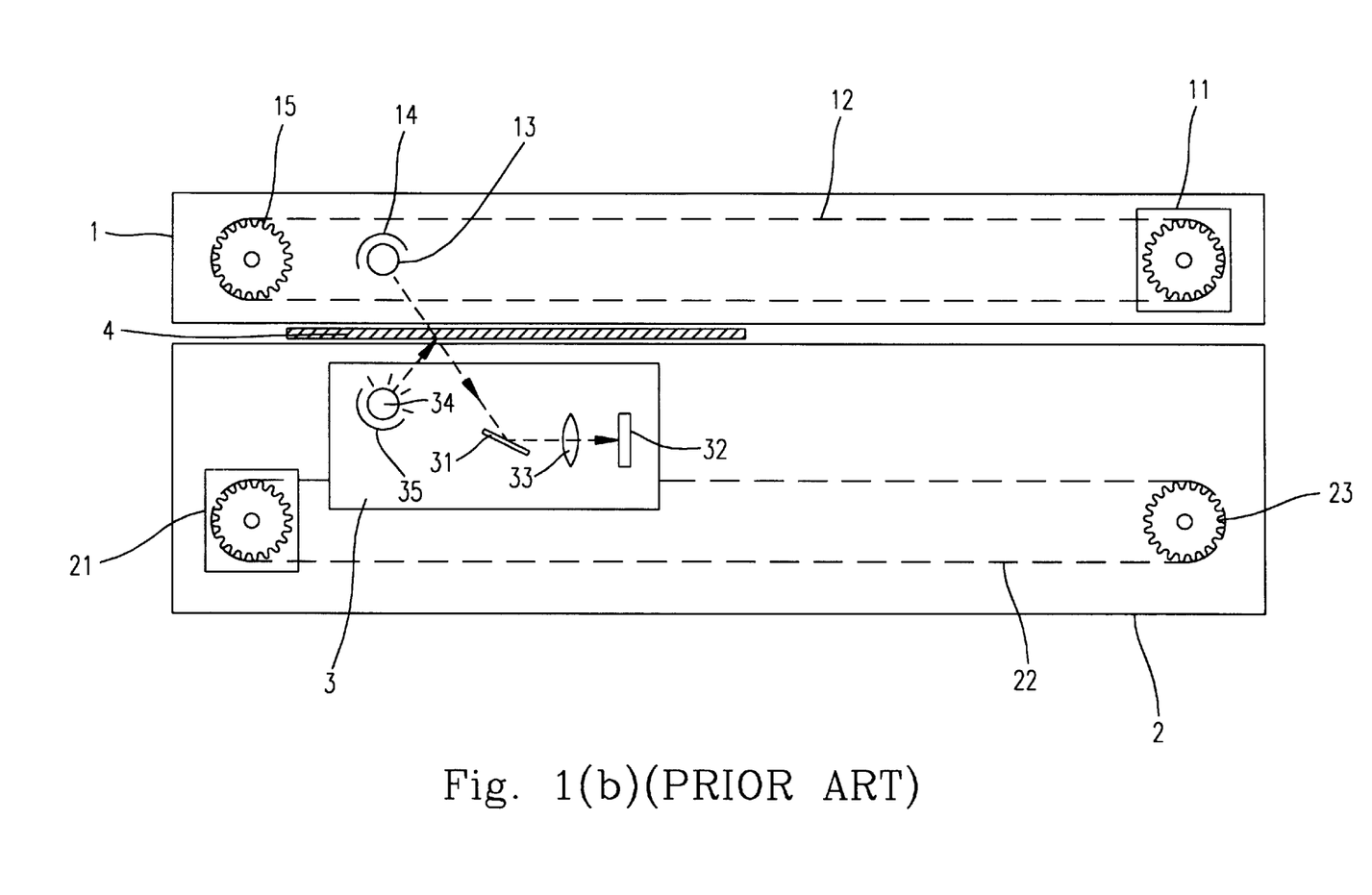

Since the transmission scanner is less popular than the reflection scanner, a scanner with both the transmission-mode function and the reflection-mode function seems more economical. A side view of a conventional scanner with both the transmission-mode function and the reflection-mode function is shown in FIG. 1(b). The devices marked with the same number as shown in FIG. 1(a) are with similar function. The additional reflective light source 34 electrically connected to the corresponding socket 35 is mounted in the moving carriage 3 to provide an optical signal. If the scanned article 4 is a transparent article such as a transparency, the transmissive light source 13 is lit to provide an optical signal for the transparency 4, and a scan optical signal is thus generated. The scan optical signal is reflected by the mirror 31, focused by the lens set 33, and converted into an electronic signal by the charge coupled device 32 in sequence. If the scanned article 4 is an opaque article such as a piece of paper, the reflective light source 34 is lit to provide an optical signal for the piece of paper 4, then a scanned optical is generated, reflected, focused, and converted into an electronic signal as stated above. The transmissive light source 13 is transferred by a driving device which includes the motor 11, the belt 12, and the gear 15 to scan the whole transparency 4, while the reflective light source 34 is mounted in the moving carriage 3 transferred by another driving device which includes the motor 21, the belt 22, and the gear 23 to scan the whole paper 4. Although the scanner serves more applications, the trouble of high production cost and complex circuit due to the two sets of driving device still exists.

A scanner with both the transmission-mode function and the reflection-mode function according to another prior art introduces a light-distributing sheet instead of the transmissive light source and the driving device mounted in the upper housing. The light-distribution sheet is a smooth-faced sheet which has two fluorescent tubes on the two sides of the smooth-faced sheet. The light is dispersed under the light-distribution sheet which covers the whole scanned article and does not need moving. The light-distribution sheet suggested by the prior art, however, can not distribute light homogeneously, so the scanning quality is affected. Another disadvantage of this scanner is the high cost of the light-distribution sheet. Thus, a better scanner with lower cost is in great hope.

SUMMARY OF THE INVENTION

An objective of the present invention is to provide a scanner with transmission-mode scanning function which has simpler structure, less constituent elements and circuits, smaller volume, and less malfunctions during operating, so that users can manage and maintain mush easier.

Another objective of the present invention is to provide a scanner with transmission-mode scanning function which has homogeneous incident light and better scanning quality so that the marketability can be anticipated.

In accordance with the present invention, a scanner with transmission-mode scanning function used for scanning an article for obtaining an electronic signal includes a housing, a scanning window having a first side and a second opposite side, a moving carriage having therein an image-picking device and mounted at the first side of the scanning window, and a combining device. The combining device includes a guiding path, a first luminous body mounted at the second opposite side of the scanning window for providing a first optical signal, and a linking device connected to the moving carriage and to the first luminous body to enable the moving carriage and the first luminous body to be synchronously moved along the guiding path.

In accordance with another aspect of the present invention, the image-picking device includes a charge coupled device for converting a scan optical signal obtained by scanning the article into the electronic signal, a mirror for transmitting the scan optical signal to the charge coupled device, and a lens set mounted between the mirror and the charge coupled device for focusing the scan optical signal.

In accordance with another aspect of the present invention, the combining device has a slot mounted alongside the scanning window. The slot positions therein the guiding path and guiding therethrough the linking device.

In accordance with another aspect of the present invention, the linking device preferably includes a connecting piece which is connected to the moving carriage, and passes through the slot to be moved with the moving carriage synchronously.

In accordance with another aspect of the present invention, the connecting piece has thereon a socket electrically connected to the first luminous body.

In accordance with another aspect of the present invention, the first luminous body may be a real luminous body, e.g. fluorescent tube and cold-cathode tube.

In accordance with another aspect of the present invention, the scanner preferably includes a second luminous body mounted in the moving carriage for providing a second optical signal. The second luminous body is a real luminous body, e.g. fluorescent tube and cold-cathode tube, or a virtual luminous body.

In accordance with another aspect of the present invention, if the second luminous body is a real luminous body, the scanner further includes a selecting switch electrically connected to the first luminous body and to the second luminous body for selecting the first luminous body or the second luminous body to be lit to provide correspondingly the first optical signal or the second optical signal, and then the article is scanned to obtain a corresponding transmissive optical signal or reflective optical signal as the scan optical signal.

In accordance with another aspect of the present invention, if the second luminous body is a virtual luminous body, the housing has an aperture for passing therethrough the first optical signal. The scanner further includes a first mirror mounted at the second opposite side of the scanning window, a second mirror mounted at the first side of the scanning window, and a third mirror mounted in the moving carriage. The first mirror is used for reflecting the first optical signal through the housing orthogonally. The second mirror is used for reflecting the first optical signal from the first mirror to be parallel to the scanning window. The third mirror is used as the virtual luminous body for transmitting the first optical signal from the second mirror to the article.

In accordance with another aspect of the present invention, the scanner preferably includes a selecting switch mounted on the housing for effecting the aperture in a light-passable state or a light-impassable state. Then the article is scanned to obtain a reflective optical signal or a transmissive optical signal respectively as the scan optical signal.

In accordance with another aspect of the present invention, the first luminous body may be a virtual luminous body while the second luminous body is a real luminous body, e.g. fluorescent tube or cold-cathode tube.

In accordance with another aspect of the present invention, the housing has an aperture for passing therethrough the second optical signal. The scanner further includes a first mirror mounted at the first side of the scanning window, a second mirror mounted at the second opposite side of the scanning window, and a third mirror mounted on the connecting piece. The first mirror is used for reflecting the second optical signal through the housing orthogonally. The second mirror is used for reflecting the second optical signal from the first mirror to be parallel to the scanning window. The third mirror is used as the virtual luminous body for transmitting the second optical signal from the second mirror to the article.

In accordance with another aspect of the present invention, the scanner preferably includes a selecting switch mounted on the housing for effecting the aperture in a light-passable state or a light-impassable state. Then the article is scanned to obtain a transmissive optical signal or a reflective optical signal respectively as the scan optical signal.

In accordance with another aspect of the present invention, the scanner further includes a pressing piece such as a transparent sheet pivotally mounted near an edge of the scanning window for covering the scanning window.

The present invention may best be understood through the following description with reference to the accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purpose of illustration and description only; it is not intended to be exhaustive or to be limited to the precise form disclosed.

Figure 2:
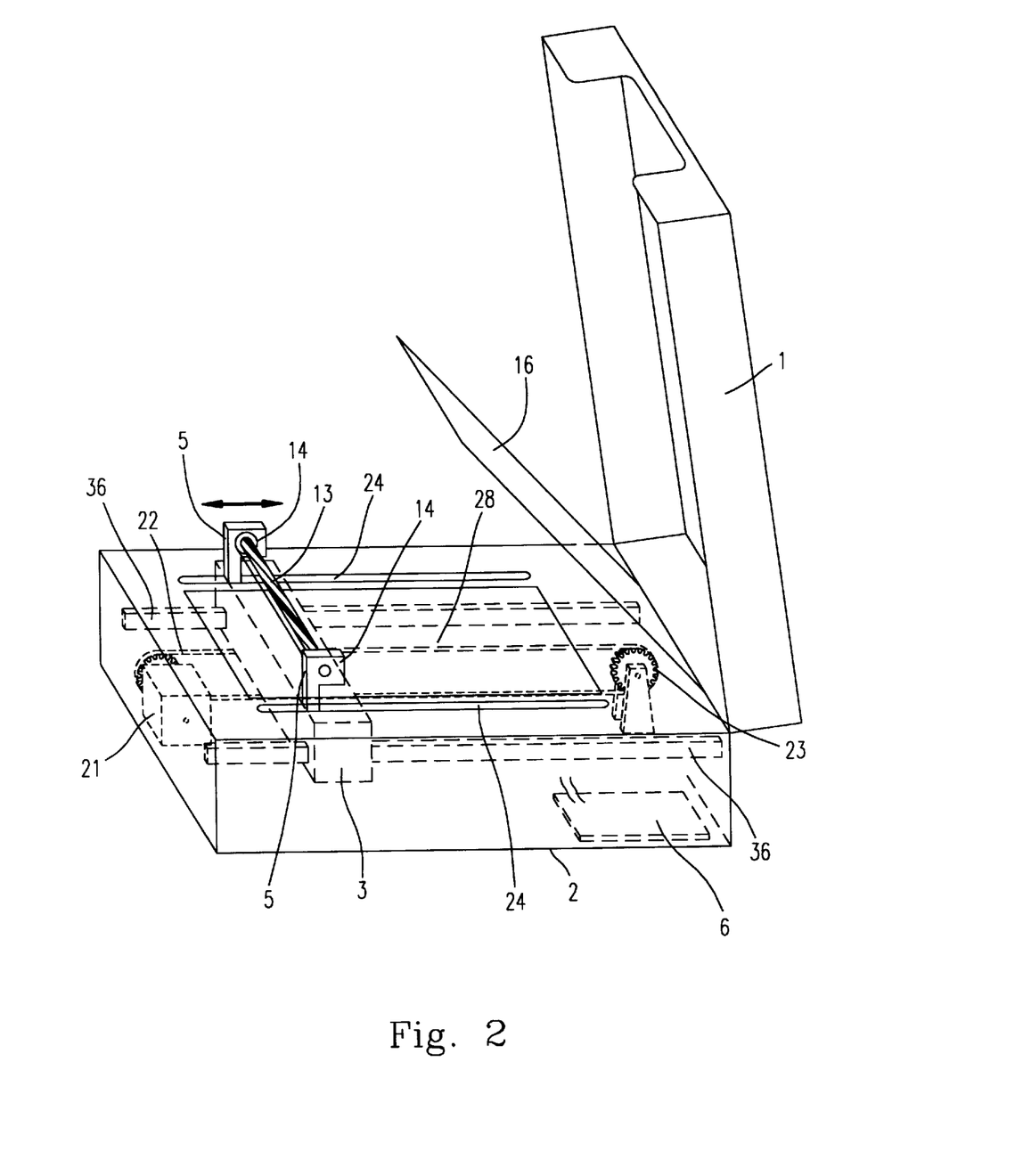
FIG. 2 is a perspective diagram showing a preferred embodiment of a scanner according to the present invention.

Among FIG. 2 to FIG. 6, the elements marked by the same reference numeral have similar function. First, please refer to FIG. 2 showing a preferred embodiment of a scanner with transmission-mode scanning function according to the present invention. The scanner has a cover 1 and a lower housing 2. The scanning window 28 mounted on the lower housing 2 is a transparent glass sheet. There are slots 24 mounted on the lower housing 2 alongside the scanning window 28. In the slots 24 exists a guiding path for guiding the linking device such as connecting pieces 5. The connecting pieces 5 are connected to the luminous body 13 via the sockets 14 and to the moving carriage 3 to enable the moving carriage 3 and the luminous body 13 synchronously moved along the slots 24 wherein the luminous body 13 is a fluorescent tube or a cold-cathode tube. The only driving device in the lower housing 2 includes a motor 21 for providing the driving power, a gear 23, and a belt 22 circulating around the motor 21 and the gear 23. The moving carriage 3 is connected to the belt 22 and is movable between the motor 21 and the gear 23. In the lower housing 2 seated the rails 36 along which the moving carriage 3 is transferred. A circuit 6 is included in a proper position of the lower housing 2 to process the obtained signals later. In addition, a pressing piece 16 constituted by a transparent sheet may be introduced to press the scanned article in order to even out irregularities, so that better scanning quality is achievable.

Figure 3:
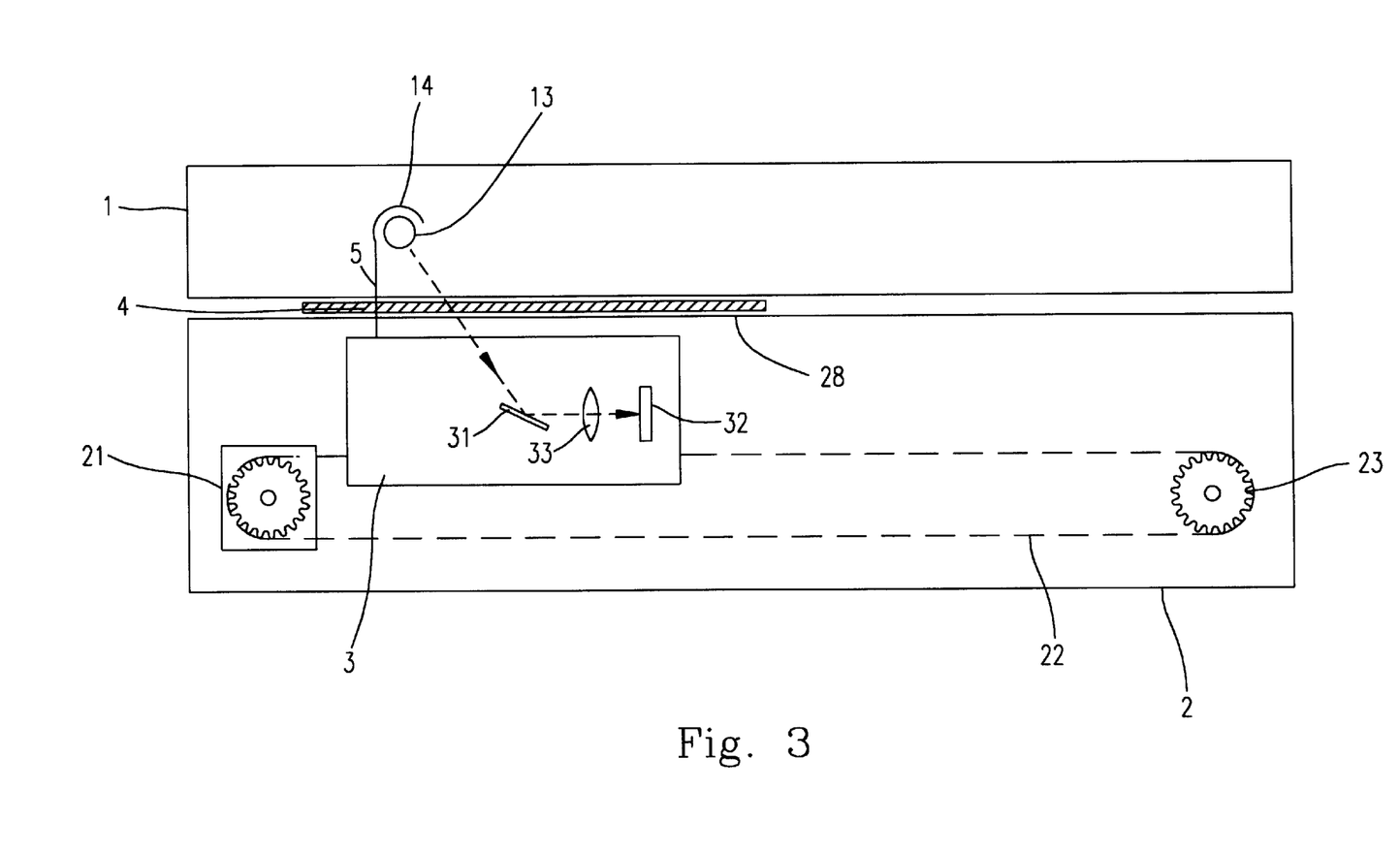
FIG. 3 is a side view showing the preferred embodiment of a scanner according to the present invention.
Figure 4:
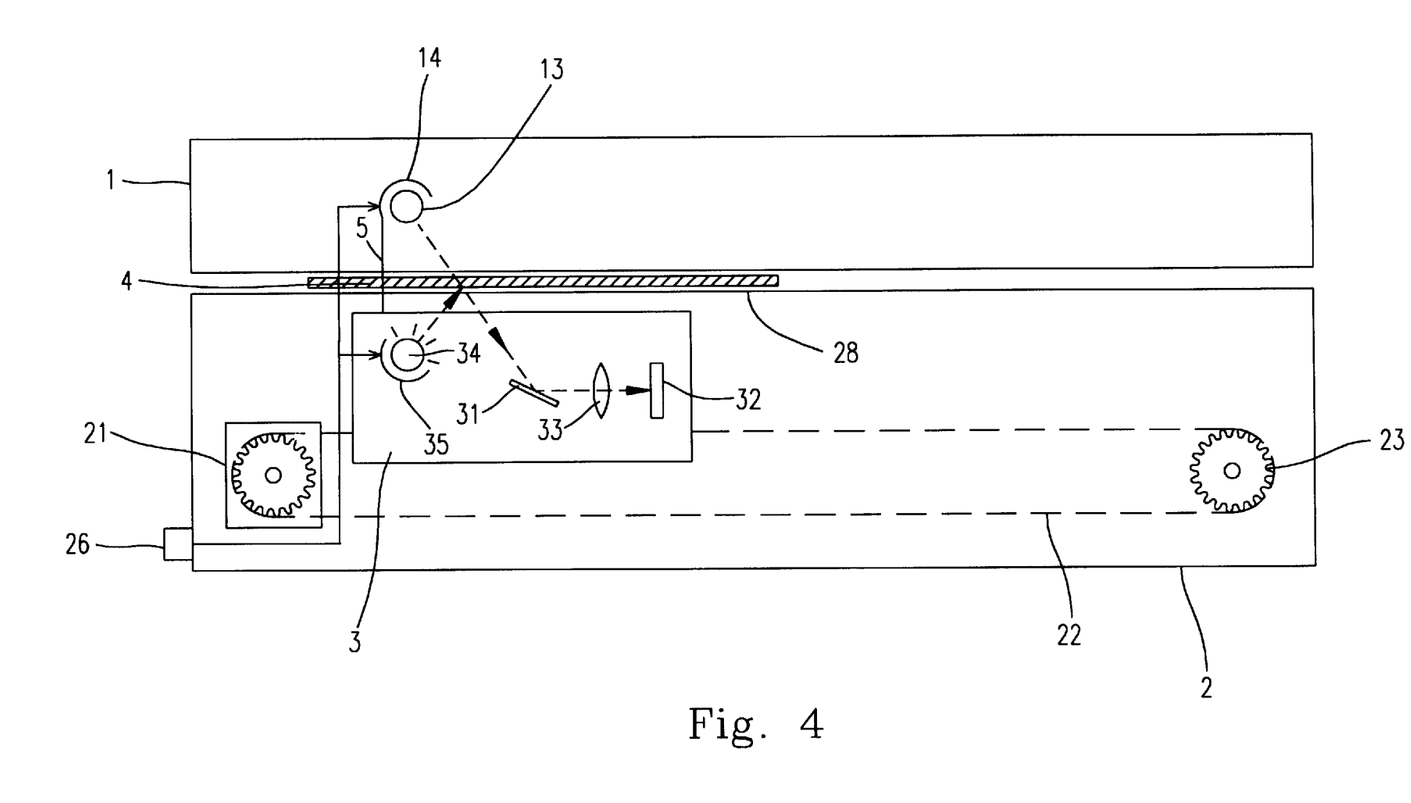
FIG. 4 is a side view showing another preferred embodiment of a scanner according to the present invention.
Figure 5:
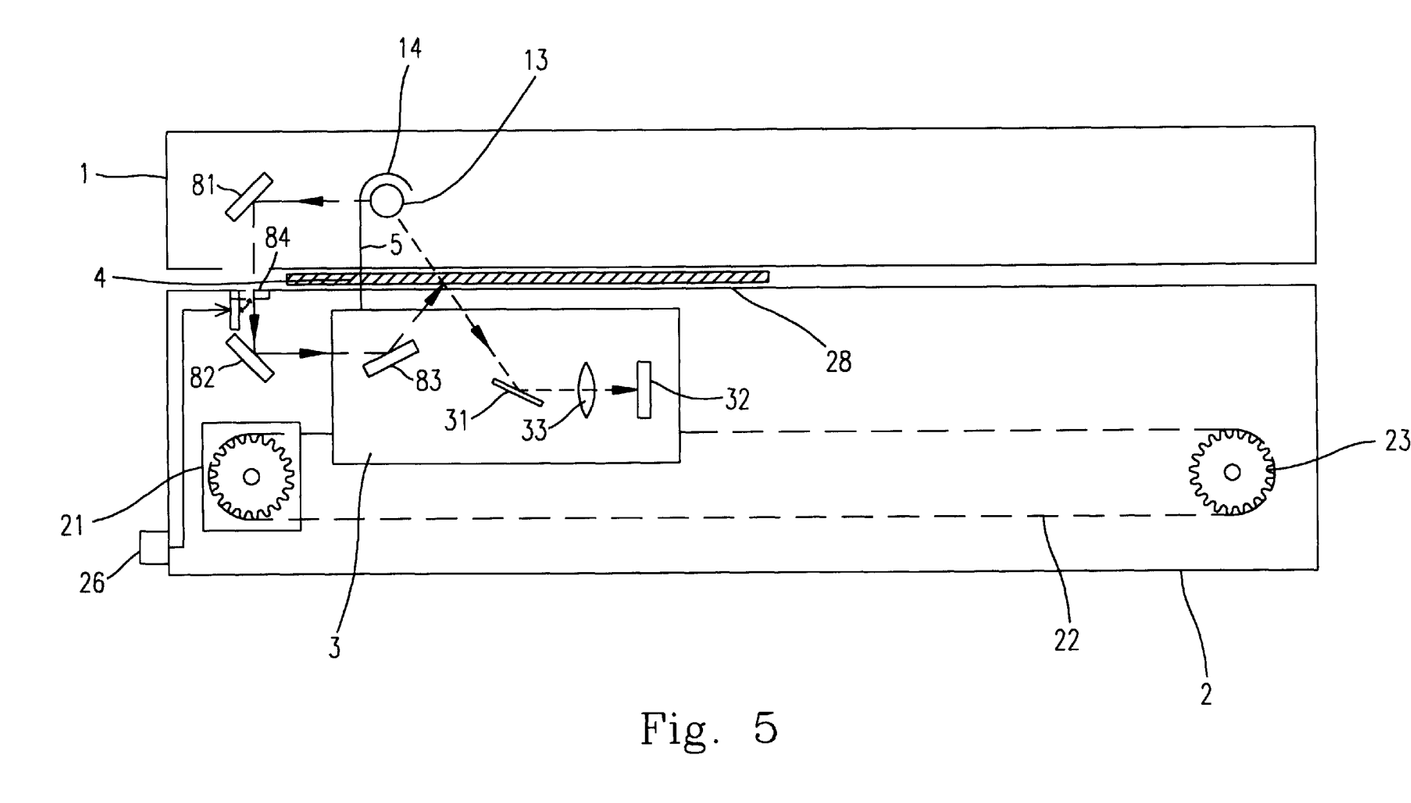
FIG. 5 is a side view showing a third preferred embodiment of a scanner according to the present invention.

Please refer to FIG. 3 which is a side view showing the preferred embodiment of FIG. 2. A transparency 4 is put on the scanning window 28 and needs to be scanned. The socket 14 accompanied with the luminous body 13 which is a lamp tube such as a fluorescent tube or a cold-cathode tube is connected to the moving carriage 3 via the connecting piece 5 to be moved with the moving carriage 3 synchronously. The lamp tube 13 provides the transparency 4 with an optical signal, and a transmissive optical signal, namely, a scan optical signal, is thus generated. Then, the mirror 31 transmits the scan optical signal to the charge coupled device 32 to convert the scan optical signal into an electronic signal for further processing. The lens set 33 mounted between the mirror 31 and the charge coupled device 32 is used for focusing the scan optical signal and reducing the length of the moving carriage 3. In order to scan the whole transparency 4, the moving carriage 3, together with the lamp tube 13, is transferred by the driving device including the motor 21, the belt 22, and the gear 23. As stated above, the scanner is equipped with only one driving device to transfer the moving carriage 3 and the lamp tube 13 synchronously. Compared to the scanner according to the first prior art, two connecting pieces 5 are added, and an extra slotting is operated on the lower housing 2, but the production cost of one set of the driving device is saved. It can be seen from the comparison, the scanner set is ultimately cheaper and less complex.

The scanner can also be applied to both transmission-mode scanning and reflection-mode scanning. Please refer to FIG. 4 which is a side view showing another preferred embodiment according to the present invention. Except for the lamp tube 34 accompanied with its socket 35 in the moving carriage 3 and the selecting switch 26 on the lower housing 2, the structure of the scanner of this preferred embodiment is the same as that of the prior preferred embodiment. The operating principle will be described in detail as follows. If the scanned article 4 on the scanning window 28 is a transparent article such as a transparency, the selecting switch 26 is selected in a transmission-mode so that the lamp tube 13 used for transmission-mode will be lit to provide the transparency 4 with an optical signal, and a transmissive optical signal, namely, a scan optical signal, is thus generated. Then, the scan optical signal is converted into an electronic signal via some steps executed by the mirror 31, the lens set 33, and the charge coupled device 32 as stated in the prior preferred embodiment for further processing. In order to scan the whole transparency 4, the lamp tube 13 is connected to the moving carriage 3 via the connecting pieces 5 and moved synchronously with the moving carriage 3 driven by the driving device including the motor 21, the belt 22, and the gear 23. On the other hand, if the scanned article 4 on the scanning window 28 is an opaque article such as a piece of paper, the selecting switch 26 is selected in a reflection-mode, so the lamp tube 34 used for reflection-mode will be lit to provide the paper 4 with an optical signal, and a reflective optical signal, namely, a scan optical signal, is thus generated. The scan optical signal is then processed by the same steps indicated before. Compared to the scanner according to the second prior art, two connecting pieces 5 are added, and an extra slotting is operated on the lower housing 2, but the production cost of one set of the driving device is saved. To put it briefly, the scanner set is eventually cheaper and less complex.

We can further substitute one of the two lamp tubes by a virtual luminous body to eliminate a lamp tube. For example, please refer to FIG. 5 which is a side view showing a third preferred embodiment according to the present invention. Three mirrors 81, 82, and 83 are mounted to provide the so-called virtual luminous body. If the scanned article 4 on the scanning window 28 is a transparent article such as a transparency, the selecting switch 26 is selected in a transmission-mode, so the aperture 84 is closed to be in a light-impassable state. The lamp tube 13 provides the transparency 4 with an optical signal, and a transmissive optical signal, namely, a scan optical signal, is thus generated. Then, the scan optical signal is converted into an electronic signal as stated in the prior preferred embodiment by the mirror 31, the lens set 33, and the charge coupled device 32 for further processing. On the other hand, if the scanned article 4 on the scanning window 28 is an opaque article such as a piece of paper, the selecting switch 26 is selected in a reflection-mode, so the aperture 28 is opened in a light-passable state. The optical signal provided by the lamp tube 13 is transmitted by the first mirror 81, the second mirror 82, and the third mirror 83 in sequence wherein the third mirror 83 is mounted in the moving carriage 3 and moved with the moving carriage 3. The path of the optical signal is described as follows. First, the optical signal generated by the lamp tube 13 is transmitted horizontally to the first mirror 81. Then, the optical signal is transmitted downwardly to the second mirror 82 via the aperture 84. At last, the optical signal is transmitted horizontally to the third mirror 83. The third mirror 83 can be viewed as a virtual luminous body because of that it is not a luminosity, but it can provide the paper 4 with an optical signal transmitted from the lamp tube 13. Then, a reflective optical signal, namely, a scan optical signal, is thus generated. The scan optical signal is then processed by the same steps indicated before.

Figure 6:
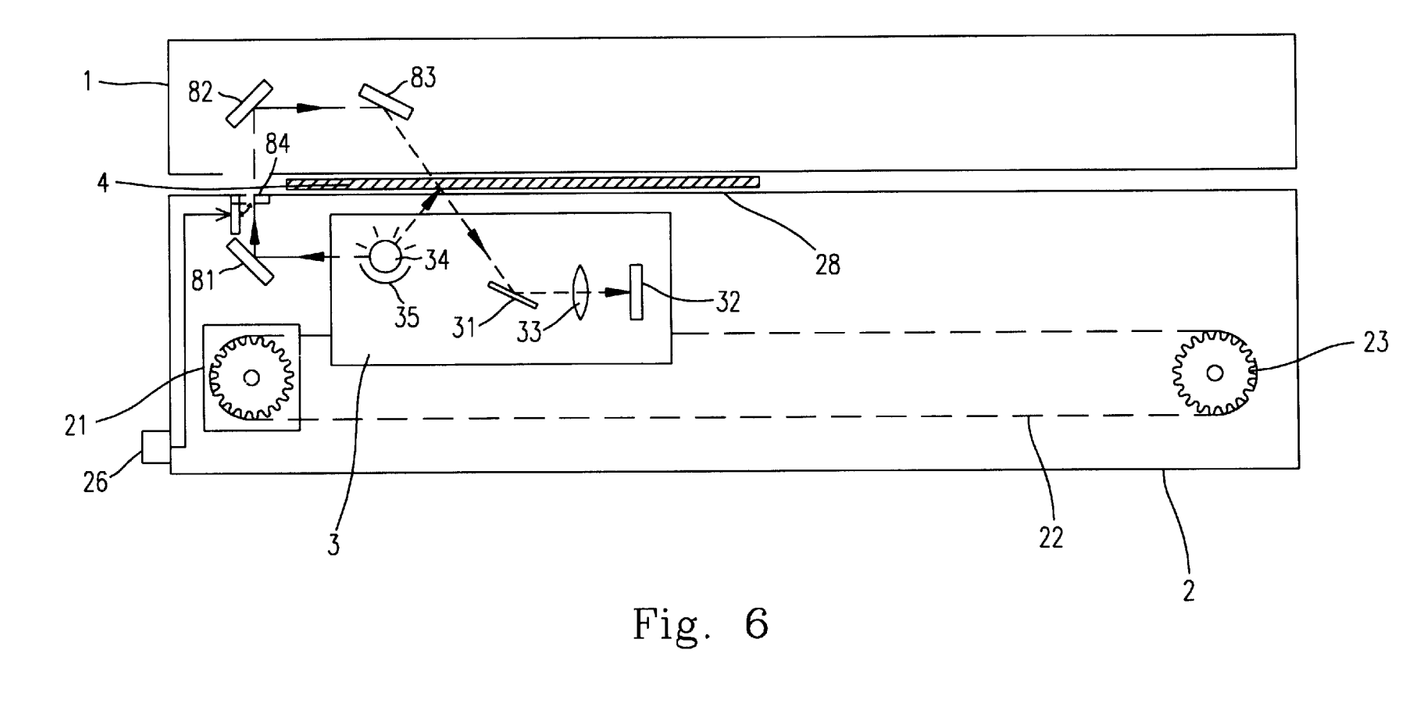
FIG. 6 is a side view showing a fourth preferred embodiment of a scanner according to the present invention.

Please refer to FIG. 6 which is a side view showing a fourth preferred embodiment according to the present invention. The structure and operating principle are similar to those of the prior preferred embodiment except that the lamp tube is put at the opposite side of the scanning window 28. Similarly, three mirrors 81, 82, and 83 are mounted to provide the so-called virtual luminous body. If the scanned article 4 on the scanning window 28 is an opaque article such as a piece of paper, the selecting switch 26 is selected in a reflection-mode so that the aperture 84 is closed to be in a light-impassable state. The lamp tube 34 provides the paper 4 with an optical signal, and a reflective optical signal, namely, a scan optical signal, is thus generated. Then, the scan optical signal is converted into an electronic signal by the mirror 3 1, the lens set 33, and the charge coupled device 32 for further processing. On the other hand, if the scanned article 4 on the scanning window 28 is a transparent article such as a transparency, the selecting switch 26 is selected in a transmission-mode to put the aperture 28 in a light-passable state. The optical signal provided by the lamp tube 34 is transmitted by the first mirror 81, the second mirror 82, and the third mirror 83 in sequence wherein the third mirror 83 is mounted on the connecting pieces 5 and moved with the moving carriage 3 synchronously. The path of the optical signal is described as follows. First, the optical signal generated by the lamp tube 34 is transmitted horizontally to the first mirror 81. Then, the optical signal is transmitted upwardly to the second mirror 82 via the aperture 84. At last, the optical signal is transmitted horizontally to the third mirror 83. The third mirror 83 can be viewed as a virtual luminous body because of that it is not a luminosity, but it can provide the transparency 4 with an optical signal transmitted from the lamp tube 34. Then, a reflective optical signal, namely, a scan optical signal, is thus generated. The scan optical signal is then processed by the same steps indicated before.

As stated above, the present invention provides a scanner with transmission-mode scanning function. The simplified structure of the scanner according to the present invention has the advantages of less circuits and elements, smaller volume, more economical production cost, and higher scanning quality. It is clear that the present invention is really practical.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A scanner with a transmission-mode and a reflection-mode scanning functions, scanning an article for obtaining an electronic signal, and comprising:
   a housing having an aperture;
   a scanning window having a first side and a second opposite side;
   a single moving carriage having therein an image-picking device, and mounted at said first side of said scanning window; and
   a combining device comprising:
      a guiding path;
      a real luminous body mounted at said second opposite side for providing a first optical signal for said transmission-mode scanning function;
      a virtual luminous body mounted at said first side for transmitting said first optical signal from said real luminous body through said aperture to said article for said reflection-mode scanning function; and
      a linking device connected to said single moving carriage and to said two luminous bodies, in which said two luminous bodies are synchronously moved by said single moving carriage along said guiding path.

2. A scanner according to claim 1 wherein said image-picking device includes:
   a charge coupled device for converting a scan optical signal obtained by scanning said article into said electronic signal;
   a mirror for transmitting said scan optical signal to said charge coupled device; and
   a lens set mounted between said mirror and said charge coupled device for focusing said scan optical signal.

3. A scanner according to claim 2 wherein said combining device has a slot positioning therein said guiding path and guiding therethrough said linking device.

4. A scanner according to claim 3 wherein said slot is mounted alongside said scanning window.

5. A scanner according to claim 4 wherein said linking device includes a connecting piece connected to said moving carriage, and passing through said slot to be moved with said moving carriage synchronously.

6. A scanner according to claim 5 wherein said connecting piece has thereon a socket electrically connected to said real luminous body.

7. A scanner according to claim 6 wherein said real luminous body is mounted at said second opposite side of said scanning window and contains one of a fluorescent tube and a cold-cathode tube.

8. A scanner according to claim 7 wherein said scanner further includes:
   a first mirror mounted at said second opposite side of said scanning window for reflecting said first optical signal through said housing orthogonally;
   a second mirror mounted at said first side of said scanning window for reflecting said first optical signal from said first mirror to be parallel to said scanning window; and
   a third mirror mounted in said moving carriage as said virtual luminous body for transmitting said first optical signal from said second mirror to said article.

9. A scanner according to claim 8 wherein said scanner further includes a selecting switch mounted on said housing for effecting said aperture in one of a light-passable state and a light-impassable state, and then said article being scanned to obtain a corresponding one of a reflective optical signal and a transmissive optical signal respectively as said scan optical signal.

10. A scanner according to claim 1 wherein said scanner further includes a pressing piece pivotally mounted near an edge of said scanning window for covering said scanning window.

11. A scanner according to claim 10 wherein said pressing piece is a transparent sheet.

12. A scanner with a transmission-mode and a reflection-mode scanning functions, scanning an article for obtaining an electronic signal, and comprising:
   a scanning window for holding said article to be scanned thereon;
   a single moving carriage having therein an image-picking device for converting an image signal from said article into said electronic signal, and mounted at a first side of said scanning window;
   a light source mounted at a second side of said scanning window opposite to said first side for providing a light signal;
   a first mirror mounted at said second side for receiving and reflecting said light signal from said light source toward said first side;
   a second mirror mounted at said first side for receiving and reflecting said light signal from said first mirror toward said single moving carriage;
   a third mirror mounted in said single moving carriage for receiving and reflecting said light signal from said second mirror toward said article which further receives and reflects said light signal from said third mirror to obtain said image signal; and
   a linking device connected said light source to said single moving carriage so that said light source and said third mirror synchronously move with said moving carriage along a guiding path.

13. A scanner according to claim 12 wherein said scanner further includes a selecting switch located between said first side and said second side for conducting a light path between said first mirror and said second mirror for said reflection-mode scanning function, and interrupting said light path for said transmission-mode function.

14. A scanner with a transmission-mode and a reflection-mode scanning functions, scanning an article for obtaining an electronic signal, and comprising:
   a housing;
   a scanning window for holding said article to be scanned thereon;
   a single moving carriage having therein an image-picking device for converting an image signal from said article into said electronic signal, and mounted at a first side of said scanning window;
   a real luminous body mounted at a second side of said scanning window opposite to said first side for providing a first optical signal;
   a virtual luminous body mounted in said single moving carriage at said first side for transmitting said first optical signal from said real luminous body to said article so as to obtain said image signal;
   a selecting switch mounted in said housing for effecting a light path from said real luminous body to said virtual luminous body in one of a conductive state and an interrupted state in order to switch said scanner between said transmission-mode and said reflection-mode scanning functions; and
   a linking device connected said real luminous body to said single moving carriage so that said real luminous body and said virtual luminous body synchronously move with said moving carriage along a guiding path.

15. A scanner according to claim 14 wherein said scanner further includes:
- a first mirror mounted at said second side of said scanning window for reflecting said first optical signal from said real luminous body toward said first side through an aperture between said first and said second sides;
- a second mirror mounted at said first side of said scanning window for reflecting said first optical signal from said first mirror through said aperture toward said single moving carriage; and
- a third mirror mounted in said moving carriage as said virtual luminous body for reflecting said first optical signal from said second mirror toward said article.

16. A scanner according to claim 15 wherein said selecting switch controls said aperture to be light-passable to effect said light path in said conductive state for said reflection-mode scanning function, and controls said aperture to be light-impassable to effect said light path in said interrupted state for said transmission-mode scanning function.

* * * * *